(12) United States Patent
Savarimuthu et al.

(10) Patent No.: US 10,517,018 B2
(45) Date of Patent: *Dec. 24, 2019

(54) LOAD BALANCING FOR A CLOUD-BASED WI-FI CONTROLLER BASED ON LOCAL CONDITIONS

(71) Applicant: Fortinet, Inc, Sunnyvale, CA (US)

(72) Inventors: Maria Valavan Savarimuthu, Sunnyvale, CA (US); Dinesh Raman, Milpitas, CA (US); Sanjay Gandotra, Santa Clara, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/811,681

(22) Filed: Nov. 14, 2017

(65) Prior Publication Data

US 2018/0176824 A1    Jun. 21, 2018

Related U.S. Application Data

(63) Continuation of application No. 14/985,293, filed on Dec. 30, 2015, now Pat. No. 9,860,789, which is a
(Continued)

(51) Int. Cl.
| | |
|---|---|
| *H04W 28/08* | (2009.01) |
| *H04L 12/26* | (2006.01) |
| *H04L 29/08* | (2006.01) |
| *H04W 76/00* | (2018.01) |
| *H04W 24/04* | (2009.01) |

(Continued)

(52) U.S. Cl.
CPC ............ *H04W 28/08* (2013.01); *H04L 43/08* (2013.01); *H04L 67/10* (2013.01); *H04L 67/1029* (2013.01); *H04L 67/1031* (2013.01); *H04W 76/00* (2013.01); *H04W 24/04* (2013.01);
(Continued)

(58) Field of Classification Search
CPC . H04W 24/04; H04W 28/08; H04W 72/1231; H04W 72/1247; H04W 76/00; H04W 84/12; H04W 24/00–04; H04L 12/26; H04L 29/08; H04L 43/08; H04L 67/10; H04L 67/1029; H04L 67/1031;
(Continued)

(56) References Cited

U.S. PATENT DOCUMENTS

| | | | |
|---|---|---|---|
| 8,795,087 B2* | 8/2014 | Kim | H04L 67/1002 463/42 |
| 9,032,081 B1* | 5/2015 | North | H04L 67/1006 709/225 |

(Continued)

*Primary Examiner* — Tri H Phan
(74) *Attorney, Agent, or Firm* — Law Office of Dorian Cartwright; Dorian Cartwright

(57) ABSTRACT

Load balancing for cloud-based monitoring of Wi-Fi devices on local access networks is based on local conditions. Requests for connection are received from Wi-Fi devices of the plurality of WLANs exceed a threshold. An indication of at least one condition for each of the WLANs is also received either with the connection request or separately. Example conditions include, without limitation, a number of local connections, network security breaches, guaranteed service levels, local latency or congestion, power outages or reboots, and the like. In response, at least one Wi-Fi device is prioritized and scheduled based on a corresponding at least one condition.

11 Claims, 6 Drawing Sheets

Related U.S. Application Data continuation-in-part of application No. 14/813,076, filed on Jul. 29, 2015, now Pat. No. 9,538,446.

(60) Provisional application No. 62/099,126, filed on Dec. 31, 2014, provisional application No. 62/098,287, filed on Dec. 30, 2014.

(51) Int. Cl.
*H04W 84/12* (2009.01)
*H04W 72/12* (2009.01)

(52) U.S. Cl.
CPC .... *H04W 72/1231* (2013.01); *H04W 72/1247* (2013.01); *H04W 84/12* (2013.01)

(58) Field of Classification Search
CPC ....... H04L 29/08144; H04L 29/08153–08297; H04L 47/125; G06F 9/5083
See application file for complete search history.

(56) References Cited

U.S. PATENT DOCUMENTS

| | | | |
|---|---|---|---|
| 9,078,137 B1 * | 7/2015 | Chechani | H04W 12/08 |
| 9,686,127 B2 * | 6/2017 | Ramachandran | G06F 16/285 |
| 9,699,144 B2 | 7/2017 | Chechani | |
| 9,742,690 B2 * | 8/2017 | Parikh | H04L 47/762 |
| 9,860,789 B2 * | 1/2018 | Savarimuthu | H04W 28/08 |
| 10,374,971 B2 * | 8/2019 | Parikh | H04L 47/762 |
| 2005/0041688 A1 | 2/2005 | Bernhard et al. | |
| 2012/0303818 A1 | 11/2012 | Thibeault | |
| 2014/0003239 A1 | 1/2014 | Etemad | |
| 2014/0012989 A1 | 1/2014 | Ko | |
| 2015/0215738 A1 | 7/2015 | Frusina | |
| 2015/0263918 A1 | 9/2015 | Nolan | |
| 2016/0099972 A1 | 4/2016 | Qureshi | |
| 2016/0373963 A1 | 12/2016 | Chechani | |

\* cited by examiner

LOAD BALANCING FOR A CLOUD-BASED WI-FI CONTROLLER BASED ON LOCAL CONDITIONS

CROSS-REFERENCE TO RELATED APPLICATIONS

This application claims the benefit of priority as a continuation to U.S. application Ser. No. 14/985,293, filed Dec. 30, 2015, entitled DIRECTED STATION ROAMING IN CLOUD MANAGED WI-FI NETWORK, by Anil KAUSHIK, which claims the benefit of priority as a continuation-in-part to U.S. application Ser. No. 14/813,076, filed Jul. 29, 2015, entitled DIRECTED STATION ROAMING IN CLOUD MANAGED WI-FI NETWORK, by Anil KAUSHIK, now issued U.S. Pat. No. 9,538,446, which claims the benefit of priority to US Application Nos. 62/098,287, filed Dec. 30, 2014, entitled LOAD BALANCING FOR CLOUD-BASED MONITORING OF DEVICES ON LOCAL ACCESS NETWORKS, by Maria Valavan SAVARIMUTHU, et al. and 62/099,126, filed Dec. 31, 2014, entitled SELF-PROVISIONING IN WI-FI NETWORKING WITH SDN (SOFTWARE-DEFINED NETWORKING) CONTROLLERS USING PREDICTIVE TRAFFIC LOADS IN A WIRELESS COMMUNICATION NETWORK, by Anil KAUSHIK, the contents of each being hereby incorporated by reference in their entirety.

FIELD OF THE INVENTION

The invention relates generally to computer networking, and more specifically, to load balancing for cloud-based monitoring of devices on LANs based on local conditions.

BACKGROUND

WLANs (wireless local access networks) experience rapidly changing conditions that can require constant monitoring. Cloud-based services, such as mCloud by Meru Networks of Sunnyvale, Calif., monitor conditions on a WLAN and provide easy access to the information without a direct connection to the WLAN. Furthermore, analytics can recognize certain conditions within the WLAN that require immediate attention, thereby triggering alerts to a network administrator.

Problematically, the cloud-based monitoring services can receive connection request from thousands of devices among thousands of WLANs, at the substantially the same time. The monitoring connections from a single WLAN device can be periodically every 10 seconds, or as configured. If a thousand devices are on the same reporting cycle, processing power of the monitoring service or network bandwidth can be overwhelmed, and the device may fail.

What is needed is a robust technique for load balancing for a cloud-based Wi-Fi controller managing and monitoring devices on local access networks, based on conditions within the local network.

BRIEF DESCRIPTION OF THE DRAWINGS

In the following drawings, like reference numbers are used to refer to like elements. Although the following figures depict various examples of the invention, the invention is not limited to the examples depicted in the figures.

SUMMARY

The shortcomings of the prior art are addressed by methods, (non-transitory) computer program products, and systems for load balancing for cloud-based monitoring of devices on local access networks based on local conditions, as described herein.

In an embodiment, requests for connection are received from Wi-Fi devices of the plurality of WLANs. The number of connection requests within a time period exceeds a threshold. An indication of at least one condition for each of the WLANs is also received either with the connection request or separately. Example conditions include, without limitation, a number of local connections, network security breaches, guaranteed service levels, local latency or congestion, power outages or reboots, and the like.

In response, at least one Wi-Fi device is prioritized based on a corresponding at least one condition. Future connections are than scheduled based on the prioritizing. Monitoring data from the Wi-Fi device in accordance with the scheduling and an action can be performed with respect to operation of the Wi-Fi device on a corresponding WLAN based on the monitoring data.

Advantageously, the cloud-based Wi-Fi controller service can reliably provide necessary actions for monitoring and management even when a number of connection requests exceeds capacity.

DETAILED DESCRIPTION

Methods, (non-transitory) computer program products, and systems for load balancing for cloud-based monitoring of devices on local access networks based on local conditions, are described. The embodiments herein are set forth for illustration of techniques that can be implemented in many other embodiments not specifically detailed herein, merely for the sake of simplicity.

Figure 2:
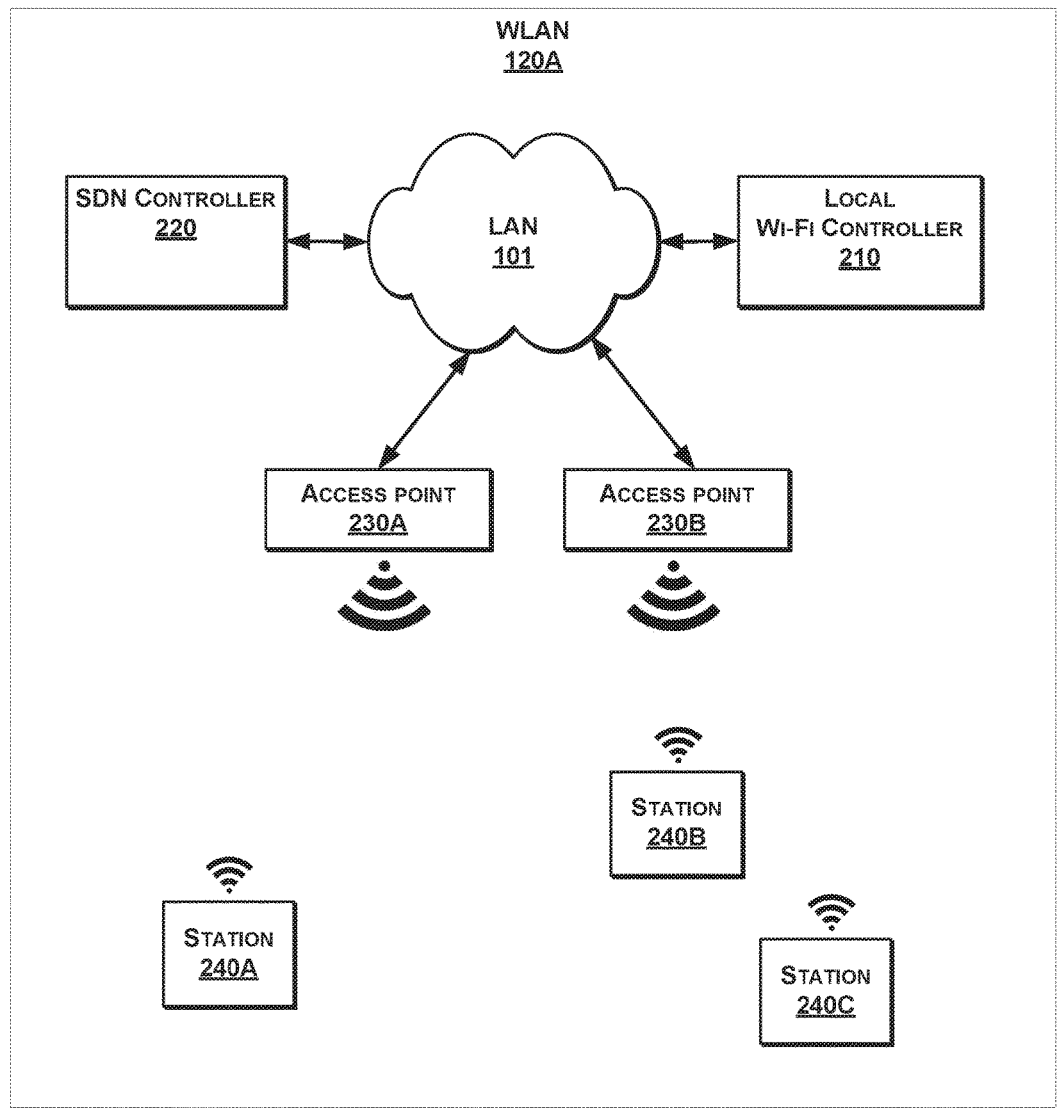
FIG. 2 is a more detailed block diagram illustrating a WLAN of FIG. 1 that is assigned slots in load balancing among numerous WLANs, according to one embodiment.
Figure 3:
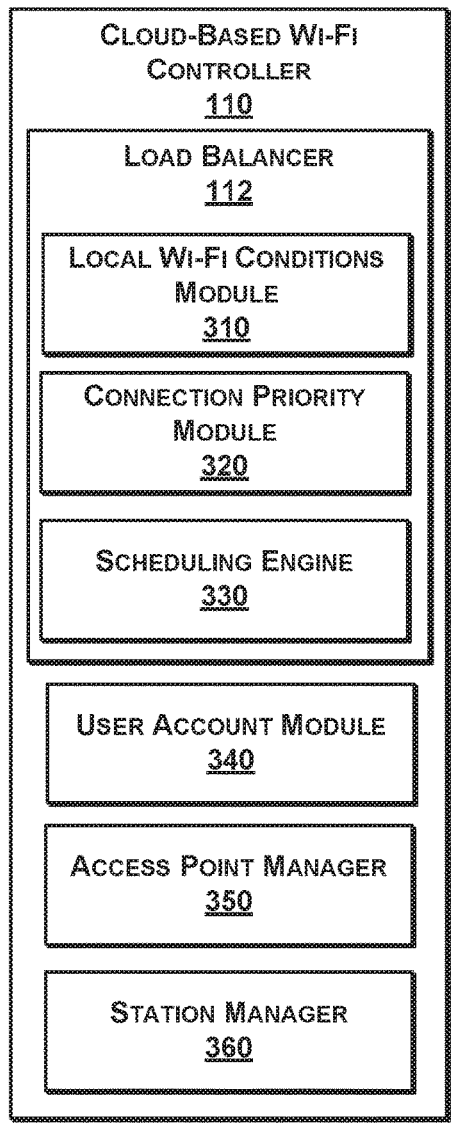
FIG. 3 is a more detailed block diagram illustrating the cloud-based Wi-Fi controller of FIG. 1, according to an embodiment.

I. Systems to Load Balance for Cloud-Monitoring of Devices (FIGS. 1-3)

Figure 1:
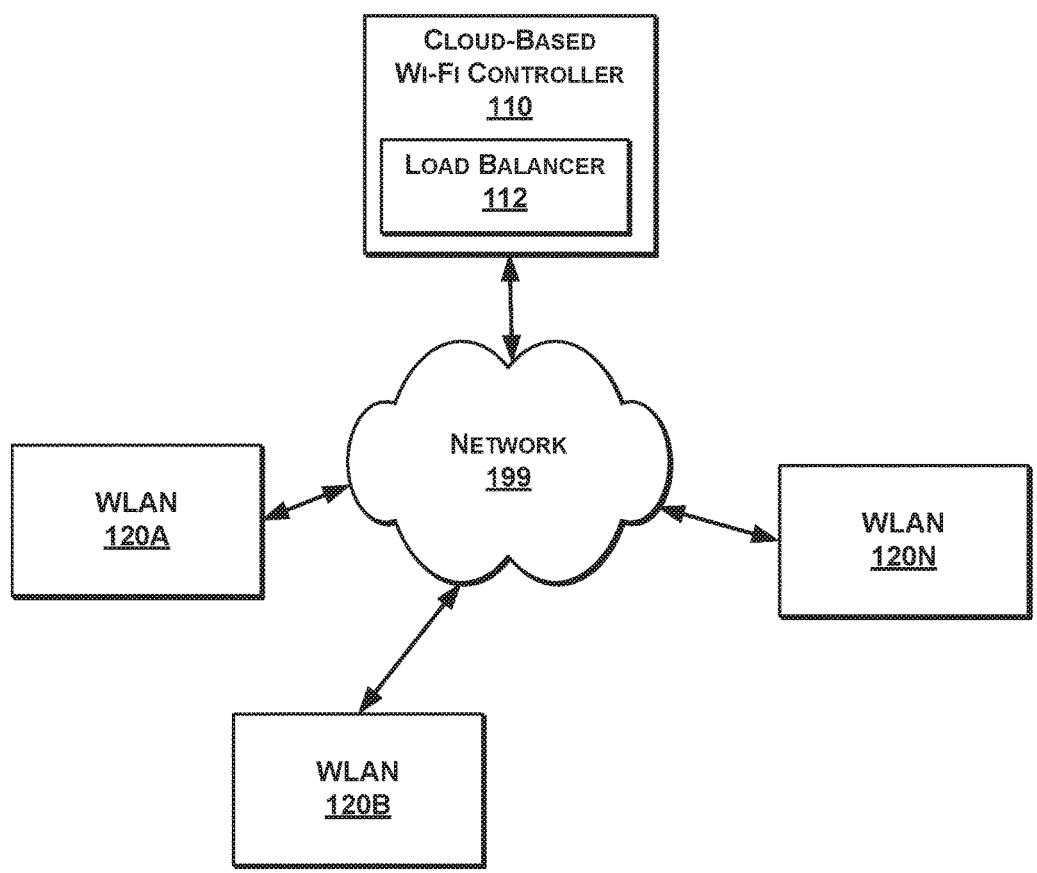
FIG. 1 is a high-level block diagram illustrating a system to load balance for a cloud-based Wi-Fi controller, according to one embodiment.

FIG. 1 is a high-level block diagram illustrating a system to load balance for a cloud-based Wi-Fi controller 110, according to one embodiment. The system 100 includes a cloud-based Wi-Fi controller 110 and WLANs 120A-120N coupled to a network 199. The components can be implemented in hardware, software, or a combination. The system of FIG. 1 is just an example of numerous other possible embodiments having more or less WLANs.

The cloud-based Wi-Fi controller 110 manages and monitors network activity for Wi-Fi devices on each of the WLANs 120A-120N. A load balancer 112 of the cloud-based Wi-Fi controller 110 manages connections for up to thousands of Wi-Fi devices (Wi-Fi devices refer to any device associated with the Wi-Fi portion of a WLAN including local controllers, access points, and stations) attempting to connect, as described further below. More specifically, one embodiment determines a volume of connections (e.g., thousands of devices) and assigns groups of connections to a particular slot within a particular period of time. Volume of connections can be actual, preconfigured, or predicted. Various algorithms can be implemented. In one implementation, each connection is treated equally. In another implementation, priorities vary with local controllers having the highest priority, access points having the next highest priority, and stations having the lowest priority. Other embodiments take additional factors into account. For example, local time on devices, latency between devices and the Wi-Fi cloud monitor 112, number of critical events occurring on devices, number of stations connected to devices, and the like. Many other factors are possible and other factors are discussed herein. Once connection slots are determined, the load balancer 112 can send a new tag to devices indicating a local time to send data and an interval length in a period. Some connection sockets can be reserved for connections outside of the algorithm. Different sets of connection sockets can be subject to different algorithms.

In one embodiment, the load balancer 112 manages connections based on local Wi-Fi conditions on an individual WLAN. Frames initially sent in a connection request to the cloud-based Wi-Fi controller 110 for Wi-Fi devices can include fields for certain Wi-Fi conditions. Fields can be within headers or pre-configured parts of the data field. Examples of conditions include, but are not limited to, number of stations connected to an access point, number of access points, amount of local Wi-Fi congestion or interference, subscription tier of entity, number of instances running on the cloud-based Wi-Fi controller 110, RSSI measurements and the like. WLAN devices connect to report data either synchronously (e.g., periodically) or asynchronously (e.g., responsive to triggering conditions). The information can be stored by the cloud-based Wi-Fi controller 110 per device, per WLAN, per entity, per geographic region, or according to various analytics.

In an embodiment, there can be more than one instance of the cloud-based Wi-Fi controller 110, and each can separately schedule connections. Separate instances can run on different physical servers, on different processors of a common device, on different threads of a common multi-threaded processor, or on different virtual machines.

A network administrator, user, or program process can log-on to get information about how many devices are connected, performance, downtime, latency, and other parameters. Information can also be pushed, particular, when thresholds are exceeded and trigger alerts. The cloud-based Wi-Fi controller 110 is discussed in more detail below with reference to FIG. 3.

The WLANs 120A-120N can be operated by different entities or the same entity, and include various combinations of devices that report to the cloud-based Wi-Fi controller 110 as regulated by the load balancer 112. One example of FIG. 2 shows a more detailed block diagram illustrating a WLAN of FIG. 1 that is assigned slots in load balancing among numerous WLANs. WLAN 120A comprises a local Wi-Fi controller 210, an SDN (software-defined networking) controller 220, access points 230A-230B, and stations 250A-250C, each of which can individually connect with the cloud-based Wi-Fi controller 110. In other embodiments, the local Wi-Fi controller 210 and/or the SDN controller 220 can collectively report data. In one embodiment, each device individually connects to the cloud-based Wi-Fi controller 110, and in a second embodiment, one or a group of representative (e.g., access points 230A-230B) connects with aggregate info that is locally collected. The WLAN components are merely an example of many possible configurations which could include more or less access points, controllers, stations, and can also include well known components such as routers, switches, and firewalls. Also, WLANs 120B and 120N can have different configurations based on entity needs.

The local Wi-Fi controller 210 (e.g., an MC1500 or MC6000 device by Meru Networks/Fortinet Inc. of Sunnyvale, Calif. as described in U.S. application Ser. No. 13/426,703 filed Mar. 22, 2012, now issued U.S. Pat. No. 9,215,754 and commonly-assigned) provides centralized management for the access points 230A-230B. The local Wi-Fi controller 210 can provide many other services to the network 199 such as virtual cell and virtual port functionalities (see further description in U.S. application Ser. No. 13/426,703, which is hereby incorporated by reference). The access points 230-230B can be an AP 110 or AP 433 (modified as discussed herein) by Meru Networks of Sunnyvale, Calif. Each access point 230A-230B is preferably connected to the LAN 101 (e.g., gateway, switch, router, hub, or another access point that is connected to the network 199) via a wired connection, but in some embodiments, such as a mesh network, the uplink connection is wireless.

The access points 230-230B can be set-up in various configurations to provide wireless coverage areas for stations to have external network access. In another embodiment, the functionality is incorporated into a switch or router.

The stations 240A-240C can be, for example, a personal computer, a laptop computer, a tablet computer, a smart phone, a mobile computing device, an Internet appliance, a non-wireless device modified to have wireless capabilities, or any other appropriate processor-driven computing device. A station is wirelessly coupled to an access point. Many other types of devices, under many other types of configurations can connect to the cloud-based Wi-Fi controller 110.

FIG. 3 is a more detailed block diagram illustrating the cloud-based Wi-Fi controller 110 of FIG. 1, according to an embodiment. The cloud-based Wi-Fi controller 110 comprises the load balancer 112, a user account module 340, an access point manager 350 and a station manager 360. Additional components are components utilized for normal operations that are not germane to the techniques described herein are present but not shown.

The load balancer 112, in turn, comprises a local Wi-Fi conditions module 210, a connection priority module 210 and a scheduling engine 330. The local Wi-Fi conditions module 210 determines what is going on currently and historically with devices connected to the Wi-Fi, such as access points and stations. In one embodiment, aggregate network metrics are submitted via connection request frames sent during a periodic connection. In another embodiment, specific condition frames are sent from a daemon or other software module executing on an access point or other part of a WLAN for collecting network metrics. In still another embodiment, specific conditions are by individual devices including each access point and each station. The local Wi-Fi conditions module 310 can extract information from incoming frames for storage in a database. Data can be stored on a per-WLAN, per-entity, per-access point, or per-station bases, for example.

The connection priority module 310 accesses the database to determine whether a default priority for a connection request should be modified. In one example, default priority is set to 0 and moves in the positive direction (e.g., +1, +2, etc.) to increase priority and in the negative direction (e.g., −1, −2, etc.) to decrease priority. In another example, conditions are weighted relative to importance on priority determination, such as emergency conditions (e.g., security alert) and sudden traffic volatility relative to a new station joining a WLAN of many stations. Subscription modules can also have an effect to allow higher paying customers to be given better service. Priority determinations and updates can be stored in the same database as conditions or separately. Many other configurations are possible.

The scheduling engine 330 uses the priority determinations as an input for scheduling connections. In one embodiment, priority is the only input. The scheduling engine 330 can assign tokens to a Wi-Fi device that presents the tokens for access. In another implementation, time slots are assigned for synchronized access. The local time of a device and latency between the cloud and device are taken into account in some non-limiting embodiments. Also, asynchronous requests can be granted on-the-fly with conflicts resolved from priority determinations.

An example of a default scheduling for even distribution can be determined by taking the capacity of an instance of the cloud-based Wi-Fi controller 110 of 100 connections per second and allow a total of 1,000 connecting devices to connect once every 10 seconds. The first 100 devices connect the first second, the second 100 devices connect the second second, and so on until the first 100 devices connect again during the eleventh second. The described modifications based on priority can be calculated and applied. As a result, a higher prioritized 100 devices may be given access the first second and again during the fifth second and every five seconds thereafter, and the other 900 devices filling in the available seconds in between. Another modification includes a WLAN entering a scheduled high usage period in which corresponding devices are elevated to the top 100 while other devices are dropped from the top 100. An embodiment, switches modes out of the default scheduling upon detection that a current amount of connection request exceeds the capacity for total connection capacity at the same time. One of ordinary skill in the art will recognize the countless other possible algorithms for implementation.

The user account module 340 allows an administrator or other entity representative to log on and see a snapshot of conditions for a particular WLAN. When the cloud-based Wi-Fi controller 110 is utilized in a SaaS (software as a service) model, multiple entities are served, so individual accounts with passwords are necessary. Each account can be configured by registering Wi-Fi devices for communication.

The access point manager 350 of an embodiment manages one or more access points for a particular entity. For example, BSSIDs (basic service set identifiers) can be assigned, station handoffs between access points are configured at different access points, and the like. In one case, a seamless mobility service uses a common BSSID across several access points and manages which access point should respond to a particular station on that WLAN. Priority can be adjusted based on seamless mobility services and current conditions.

The station manager 360 of an embodiment manages one or more stations for a particular entity, or for a particular access point being managed. One implementation of virtual port services assigns a unique BSSID to each station for individual management of the connection (e.g., policy, uplink speed, permissions, etc.). When handing off a station from one access point to another access point using the virtual port service, the unique BSSID is moved from being handled by one access point to another access point. Priority for an access point or a particular station can be adjusted based on virtual port services and current conditions.

II. Methods for Load Balancing for Cloud-Monitoring of Devices (FIGS. 4-5)

Figure 4:
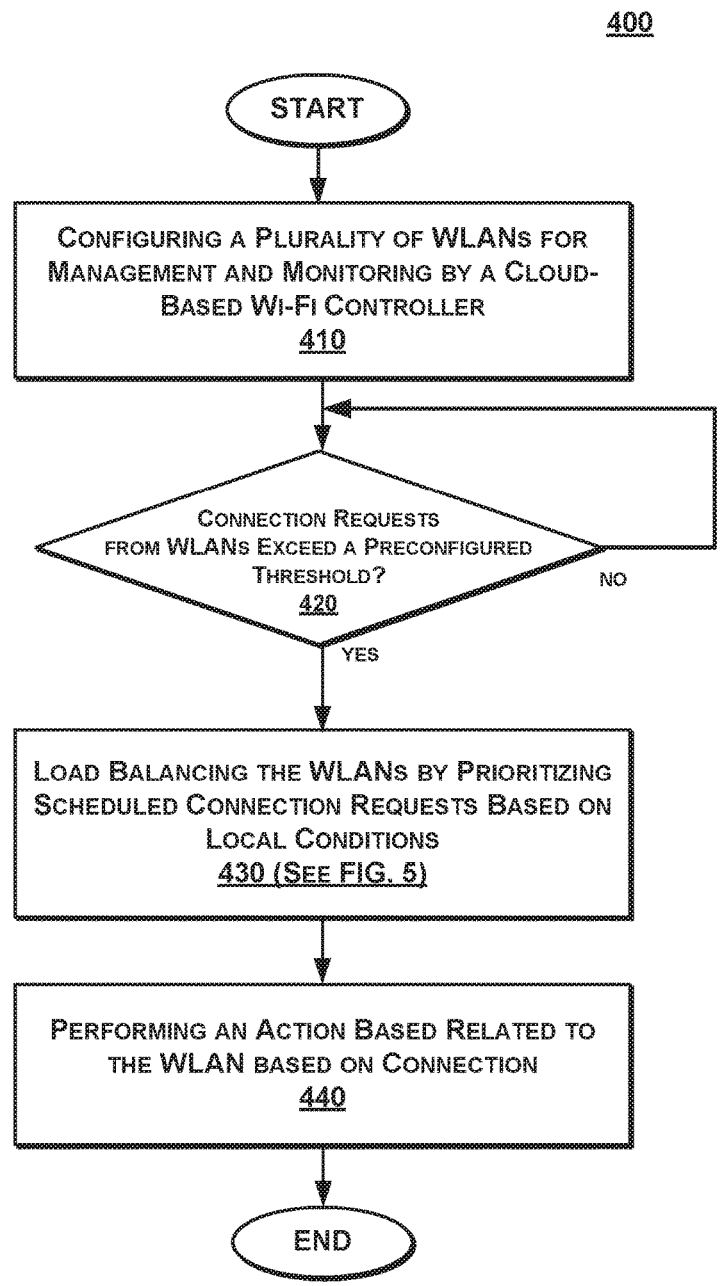
FIG. 4 is a flow chart illustrating a method for load balancing for cloud-based monitoring of devices, according to one embodiment.

FIG. 4 is a flow chart illustrating a method 400 for load balancing for cloud-based monitoring of devices, according to one embodiment. One of ordinary skill in the art will recognize that the method 400 is non-limiting as other embodiments can have more or less steps and can be performed in a different order.

A plurality of WLANS are configured for management and monitoring by a cloud-based Wi-Fi controller (step 410). If the connection requests from WLANs exceed a preconfigured threshold (step 420), in the present embodiment, the WLANS and associated Wi-Fi devices are load balanced by prioritizing scheduled connection requests based on local conditions (step 430) (as discussed in more detail below in association with FIG. 5). An action related to the WLAN is performed based on the connection (step 440). For example, an alert may be sent to an administrator or virtual port services can be temporarily suspended.

Figure 5:
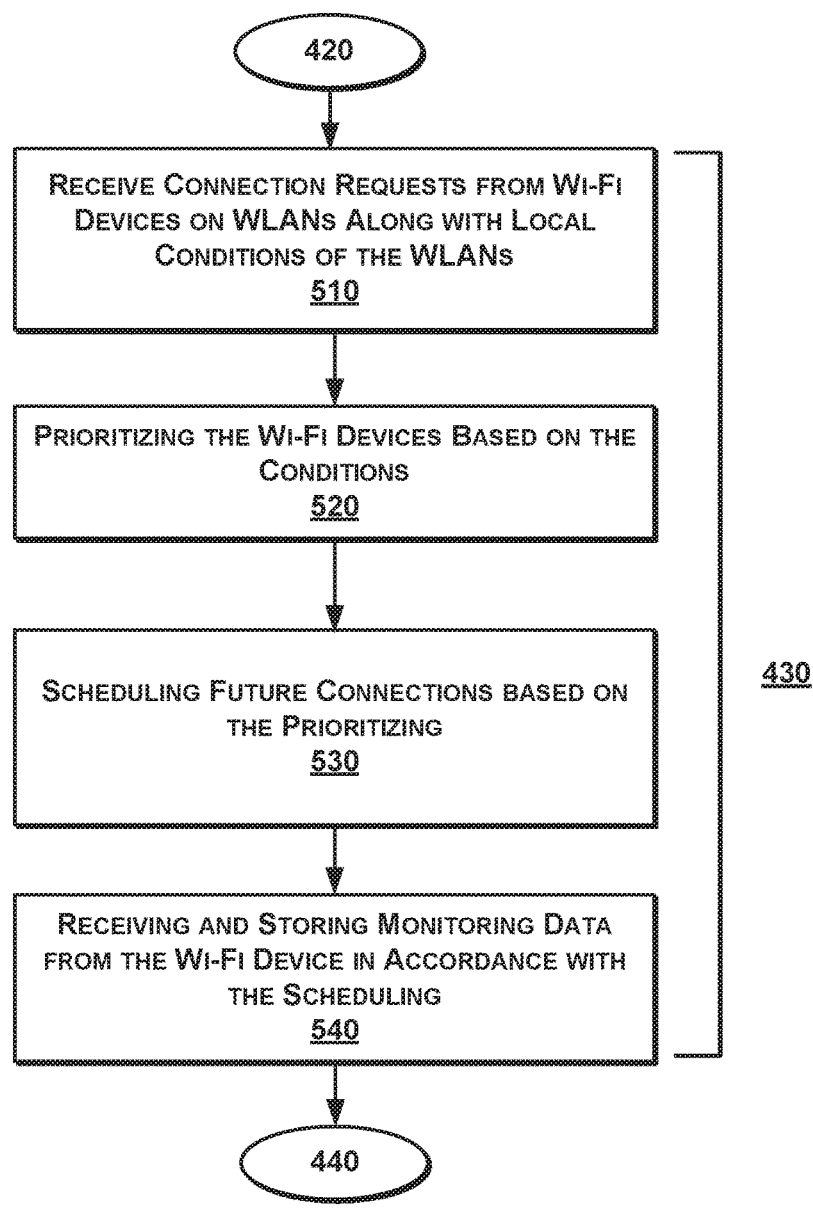
FIG. 5 is a more detailed flow chart illustrating a step of load balancing from FIG. 4, according to one embodiment.

FIG. 5 is a more detailed flow chart illustrating the step 430 of load balancing from FIG. 4, according to one embodiment.

Connection requests are received from Wi-Fi devices on WLANs along with local conditions of the WLANs (step 510). The local conditions are extracted and analyzed. The Wi-Fi devices are prioritized based on the local conditions (step 520). Future connections are scheduled based on the prioritizing (step 530). Monitoring data from the Wi-Fi device is received and stored in accordance with the scheduling. In some cases, monitoring data is the same, similar, or a part of local conditions.

III. Generic Computing Device (FIG. 6)

Figure 6:
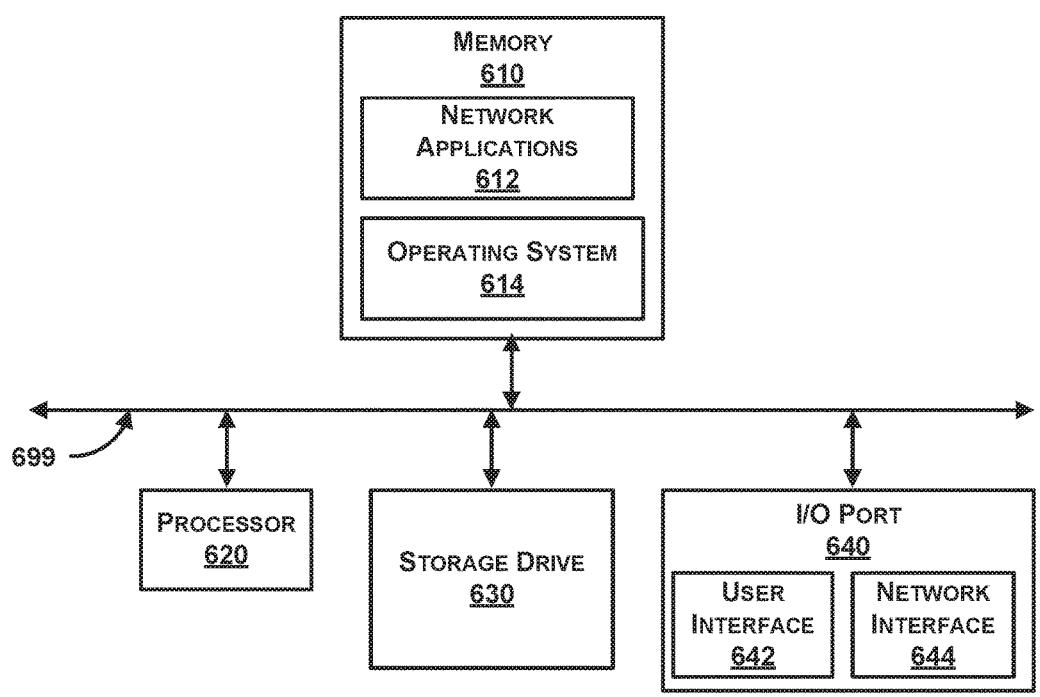
FIG. 6 is a block diagram illustrating an exemplary computing device, according to one embodiment.

FIG. 6 is a block diagram illustrating an exemplary computing device 600 for use in the system 100 of FIG. 1, according to one embodiment. The computing device 600 is an exemplary device that is implementable for each of the components of the system 100, including cloud-based Wi-Fi controller 110, the local Wi-Fi controller 210, the SDN controller 220, the access points 230A, 230B, and the stations 240A-240C. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include the modules of the components illustrated in FIGS. 1-4. Other network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 65, 68, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630

The storage drive 630 can be any non-volatile type of storage such as a magnetic disc, EEPROM, Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

IV. Additional Embodiments

Generally, one of ordinary skill in the art will recognize that the examples set forth herein are non-limiting and only illustrative of widely-applicable principles. Accordingly, this description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method for load balancing in a cloud-based Wi-Fi controller device that remotely monitors access points for a plurality of WLANs (wireless local access networks) on a data communication network, the method comprising the steps of:
    receiving, at a network interface of the cloud-based controller device coupled in communication to the data communication network, requests for connection from the access points of the plurality of WLANs, wherein the number of connection requests within a time period exceeds a threshold and wherein the connection requests concern monitoring data being reported upstream;
    receiving an indication of at least one condition for each of the WLANs;
    prioritizing at least one access point based on a corresponding at least one condition;
    scheduling future connections for the access points based on the prioritizing;
    receiving monitoring data from the access point in accordance with the scheduling; and
    performing at least one action with respect to operation of the access point don a corresponding WLAN based on the monitoring data.

2. The method of claim 1, wherein the number of connection requests within a time period exceeds a total capacity of connection requests.

3. The method of claim 1, wherein the local conditions comprise at least one from the group of: a number of local connections, type of Wi-Fi device, a vulnerability detection, an intrusion detection, a rogue device detection, a power outage, a reboot, local latency, local congestion, and a change in a local condition surpassing a threshold.

4. The method of claim 1, wherein the prioritizing is based on a service tier of an entity associated with the access point.

5. The method of claim 1, further comprising:
    receiving a local time of the Wi-Fi device;
    receiving a flight time between the access point and the cloud-based Wi-Fi controller;
    calculating a dispatch time for a connection request using the local time and the flight time; and
    sending the dispatch time to the Wi-Fi device.

6. The method of claim 1, wherein the received monitoring data is used as the indication of at least one condition for scheduling latter connections.

7. The method of claim 1, further comprising:
    activating a load balancing mode responsive to the number of requests within the time period exceeding the threshold.

8. The method of claim 1, further comprising:
spawning more than one cloud-based Wi-Fi controller instance, wherein load balancing considers available connects across the more than one cloud-based Wi-Fi controller instance.

9. The method of claim 1, wherein the access point operates according to at least one of IEEE 802.11n, IEEE 802.11 ac wave 2, and a Wi-Fi protocol that supports beamforming.

10. A non-transitory computer-readable medium storing source code that, when executed by a processor, performs a method load for balancing in a cloud-based Wi-Fi controller device that remotely monitors Wi-Fi devices for a plurality of WLANs (wireless local access networks), the method comprising the steps of:
receiving, at a network interface of the cloud-based controller device coupled in communication to the data communication network, requests for connection from the access points of the plurality of WLANs, wherein the number of connection requests within a time period exceeds a threshold and wherein the connection requests concern monitoring data being reported upstream;
receiving an indication of at least one condition for each of the WLANs;
prioritizing at least one access point based on a corresponding at least one condition;
scheduling future connections for the access points based on the prioritizing;
receiving monitoring data from the access point in accordance with the scheduling; and
performing at least one action with respect to operation of the access point on a corresponding WLAN based on the monitoring data.

11. A cloud-based Wi-Fi controller device that load balances while remotely Wi-Fi devices for a plurality of WLANs (wireless local access networks), the cloud-based Wi-Fi controller comprising:
a processor; and
a memory, storing:
a first module to receive, at a network interface of the cloud-based controller device coupled in communication to the data communication network, requests for connection from the access points of the plurality of WLANs, wherein the number of connection requests within a time period exceeds a threshold and wherein the connection requests concern monitoring data being reported upstream;
a second module to receive an indication of at least one condition for each of the WLANs;
a third module to receive at least one access point based on a corresponding at least one condition;
a fourth module to schedule future connections for the access points based on the prioritizing;
a fifth module to monitor data from the access point in accordance with the scheduling; and
a sixth module to perform at least one action with respect to operation of the access point on a corresponding WLAN based on the monitoring data.

* * * * *